(12) United States Patent
Amachi et al.

(10) Patent No.: US 11,102,747 B2
(45) Date of Patent: Aug. 24, 2021

(54) LOCATION ESTIMATION SYSTEM AND LOCATION ESTIMATION METHOD

(71) Applicant: Murata Manufacturing Co., Ltd., Kyoto (JP)

(72) Inventors: Nobumitsu Amachi, Kyoto (JP); Tetsu Nishimura, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 200 days.

(21) Appl. No.: 16/297,912

(22) Filed: Mar. 11, 2019

(65) Prior Publication Data

US 2019/0208494 A1    Jul. 4, 2019

Related U.S. Application Data

(63) Continuation of application No. PCT/JP2017/033143, filed on Sep. 13, 2017.

(30) Foreign Application Priority Data

Sep. 23, 2016  (JP) .............................. JP2016-185861

(51) Int. Cl.
*H04W 64/00* (2009.01)
*H04W 4/02* (2018.01)
(Continued)

(52) U.S. Cl.
CPC ............ *H04W 64/003* (2013.01); *G01S 5/14* (2013.01); *H04B 17/27* (2015.01); *H04B 17/318* (2015.01);
(Continued)

(58) Field of Classification Search
None
See application file for complete search history.

(56) References Cited

U.S. PATENT DOCUMENTS 5,615,409 A    3/1997  Forssén et al.
5,987,329 A *  11/1999  Yost ...................... H04W 64/00
                                                 455/456.1
(Continued)

FOREIGN PATENT DOCUMENTS

JP    H07-245579 A    9/1995
JP    H08-508865 A    9/1996
(Continued)

OTHER PUBLICATIONS

U.S. Appl. No. 62/032,371, filed Aug. 1, 2014, "Partially Synchronized Multilateration/Trilateration Method and System for Positional Finding using RF", Markhovsky et al.*

(Continued)

*Primary Examiner* — Gregory B Sefcheck
(74) *Attorney, Agent, or Firm* — Pearne & Gordon LLP (57) ABSTRACT

A location estimation system includes non-directional stationary devices having respective non-directional antennas configured to receive a radio signal transmitted by a mobile device; and directional stationary devices having respective directional antennas configured to receive a radio signal transmitted by the mobile device. The non-directional stationary devices output, as pieces of location estimation information for estimating a location of the mobile device, pieces of information indicating received signal strength indicators of the received radio signal. The directional stationary devices output, as pieces of complementary information for identifying a non-directional stationary device used for location estimation from among the non-directional stationary devices, pieces of information indicating received signal strength indicators of the received radio signal.

12 Claims, 6 Drawing Sheets

(51) Int. Cl.
  *H04B 17/318* (2015.01)
  *G01S 5/14* (2006.01)
  *H04B 17/27* (2015.01)
  *H04W 84/18* (2009.01)

(52) U.S. Cl.
  CPC ........... *H04W 4/023* (2013.01); *H04W 64/00* (2013.01); *H04W 84/18* (2013.01)

(56) References Cited

U.S. PATENT DOCUMENTS

| | | | |
|---|---|---|---|
| 7,659,850 B1 * | 2/2010 | Hou | G01S 5/14 342/451 |
| 7,714,778 B2 * | 5/2010 | Dupray | H04W 64/00 342/357.31 |
| 7,733,224 B2 * | 6/2010 | Tran | A61B 7/04 340/540 |
| 8,050,686 B1 * | 11/2011 | Souissi | G01S 5/12 455/456.1 |
| 8,200,239 B2 * | 6/2012 | Mia | H04W 64/003 455/456.1 |
| 8,467,991 B2 * | 6/2013 | Khosravy | G06F 3/04883 702/153 |
| 9,257,028 B2 * | 2/2016 | Parkulo | H04W 84/18 |
| 9,507,007 B2 * | 11/2016 | Markhovsky | G01S 5/0215 |
| 9,677,887 B2 * | 6/2017 | Werner | G01C 21/00 |
| 9,871,568 B2 * | 1/2018 | Jung | H04B 7/0617 |
| 9,918,234 B2 * | 3/2018 | Zerick | H04W 24/02 |
| 9,998,856 B2 * | 6/2018 | Edge | G01S 5/0236 |
| 10,009,868 B1 * | 6/2018 | Reyes | G06Q 30/0261 |
| 10,281,557 B2 * | 5/2019 | Markhovsky | G01S 5/0205 |
| 10,389,509 B2 * | 8/2019 | Stirling-Gallacher | H04W 72/1231 |
| 2005/0032531 A1 * | 2/2005 | Gong | G01S 3/28 455/456.5 |
| 2006/0217132 A1 | 9/2006 | Drummond-Murray et al. | |
| 2011/0110242 A1 | 5/2011 | Nixon et al. | |
| 2012/0295635 A1 | 11/2012 | Yokota et al. | |
| 2015/0248783 A1 * | 9/2015 | Fayle | H04W 4/023 345/633 |
| 2019/0053013 A1 * | 2/2019 | Markhovsky | H04L 43/0864 |
| 2019/0285722 A1 * | 9/2019 | Markhovsky | G01S 7/4861 |

FOREIGN PATENT DOCUMENTS

| | | |
|---|---|---|
| JP | H08-307927 A | 11/1996 |
| JP | 2000-207673 A | 7/2000 |
| JP | 2009-109257 A | 5/2009 |
| JP | 3151068 U | 6/2009 |
| JP | 2009-243988 A | 10/2009 |
| JP | 2012-251959 A | 12/2012 |
| JP | 5708143 B2 | 4/2015 |
| JP | 2015-232564 A | 12/2015 |

OTHER PUBLICATIONS

International Search Report for International Application No. PCT/JP2017/033143, dated Dec. 12, 2017.
Written Opinion for International Application No. PCT/JP2017/033143, dated Dec. 12, 2017.

* cited by examiner

LOCATION ESTIMATION SYSTEM AND LOCATION ESTIMATION METHOD

This is a continuation of International Application No. PCT/JP2017/033143 filed on Sep. 13, 2017 which claims priority from Japanese Patent Application No. 2016-185861 filed on Sep. 23, 2016. The contents of these applications are incorporated herein by reference in their entireties.

BACKGROUND

Technical Field

The present disclosure relates to a location estimation system and a location estimation method and particularly relates to a location estimation system used as a system that estimates the location of a mobile device in accordance with received signal strength indicators obtained when three or more stationary devices receive a radio signal transmitted by the mobile device, and a location estimation method.

In recent years, with the development of radio communications, location estimation systems have been proposed that estimate the location of a mobile device, by using a three-point positioning method, on the basis of RSSIs (Received Signal Strength Indicators) obtained when three or more non-directional stationary devices receive a radio signal transmitted by the mobile device. In such a location estimation system, if a radio signal transmitted by the mobile device is affected by multipath, attenuation due to shielding, and so forth (hereinafter referred to as "multipath and so forth"), a relationship between a received signal strength indicator at a stationary device and a distance between the mobile device and the stationary device corresponding to the received signal strength indicator collapses, thereby increasing an error in location estimation.

Thus, various techniques have been proposed that reduce such an error in location estimation (see Patent Documents 1 and 2, for example).

In Patent Document 1, arithmetic processing (filtering) is performed, for example, only a high received signal strength indicator is used, and thus a range covered by each of stationary devices is narrowed, thereby reducing an error in location estimation based on multipath and so forth.

Furthermore, in Patent Document 2, a stationary device that transmits a radio signal includes two antennas having different directivities, and a change in a received signal strength indicator at a mobile device due to switching between the antennas is used in approach detection, thereby reducing an error in location estimation based on multipath and so forth. Although, in this technique, the stationary device transmits a radio signal and the mobile device receives the radio signal, even the opposite technique achieves the same effect as the technique for reducing an error in location estimation based on multipath and so forth.

Patent Document 1: Japanese Patent No. 5708143
Patent Document 2: Japanese Unexamined Patent Application Publication No. 2009-109257

BRIEF SUMMARY

In the technique disclosed in Patent Document 1, however, to perform arithmetic processing, for example, to use only a high received signal strength indicator at a stationary device, the number of stationary devices has to be increased to estimate a location by using three-point positioning, thereby resulting in an increase in cost in a location estimation system as a whole. Furthermore, even if the number of stationary devices is simply increased, a point can occur where a relationship between a received signal strength indicator and a distance between a stationary device and a mobile device is reversed due to multipath and so forth, and thus accuracy of location estimation is poor.

Furthermore, in the technique disclosed in Patent Document 2, the application of the technique to a system in which location estimation and intercommunication between stationary devices are performed using the same radio communications disconnects the interconnection between the stationary devices each time antennas having different directivities are switched, and routing has to be performed again.

Thus, the present disclosure has been made in view of the above issues and provides a location estimation system in which an error in location estimation based on multipath and so forth is reduced, and a location estimation method. The location estimation system does not cause a great increase in cost and can also be used as a system in which location estimation and intercommunication between stationary devices are performed using the same radio communications.

A location estimation system according to one embodiment of the present disclosure is a location estimation system used as a system that estimates a location of a mobile device in accordance with received signal strength indicators obtained when three or more stationary devices receive a radio signal transmitted by the mobile device. The location estimation system includes three or more non-directional stationary devices having a non-directional antenna configured to receive a radio signal transmitted by the mobile device; and a directional stationary device having a directional antenna configured to receive a radio signal transmitted by the mobile device. The three or more non-directional stationary devices output, as pieces of location estimation information for estimating the location of the mobile device, pieces of information indicating received signal strength indicators of the received radio signal. The directional stationary device outputs, as a piece of complementary information for identifying a non-directional stationary device used for location estimation from among the three or more non-directional stationary devices, a piece of information indicating a received signal strength indicator of the received radio signal.

Thus, the location estimation system according to one embodiment of the present disclosure includes the directional stationary device that outputs a piece of complementary information for identifying a non-directional stationary device used for location estimation from among the three or more non-directional stationary devices, the use of a piece of complementary information can therefore avoid the use, for location estimation, of a received signal strength indicator of a non-directional stationary device that has been erroneously detected due to the effects of multipath and so forth, and an error in location estimation based on multipath and so forth is reduced. An existing location estimation system is constituted only by a non-directional stationary device, whereas the directional stationary device that acts as a complementary role is simply added without, for example, necessarily increasing or changing the number or locations of non-directional stationary devices used for location estimation, and thus the location estimation system that estimates the location of the mobile device with high accuracy is constructed without necessarily causing a great increase in cost. Furthermore, with respect to a non-directional stationary device used for location estimation, a plurality of antennas do not have to be switched as in the related art, and thus the location estimation system that can also be used as a system in which location estimation and intercommunication between stationary devices are performed using the same radio communications is constructed.

Here, the directional stationary device may be disposed in proximity to one non-directional stationary device of the three or more non-directional stationary devices.

Thus, when a reception condition at the directional stationary device is taken into account, it can be determined whether the mobile device is located close to a non-directional stationary device in proximity to which the directional stationary device is disposed, thereby keeping a received signal strength indicator of a non-directional stationary device that has been erroneously detected due to the effects of multipath and so forth from being used for location estimation.

Furthermore, the location estimation system includes a plurality of the directional stationary devices, and each of the plurality of the directional stationary devices may be disposed in proximity to one different non-directional stationary device of the three or more non-directional stationary devices.

Thus, when reception conditions at the directional stationary devices disposed in proximity to all the non-directional stationary devices are taken into account, it can be determined whether the mobile device is located close to each non-directional stationary device, thereby keeping a received signal strength indicator of a non-directional stationary device that has been erroneously detected due to the effects of multipath and so forth from being used for location estimation.

Furthermore, the three or more non-directional stationary devices may be disposed outside a region in which the mobile device moves, and the directional stationary device may be disposed so that a direction in which a gain of the directional antenna reaches a maximum value points towards the region.

Thus, a motion region, which is a region in which the mobile device moves, is known in advance, the non-directional stationary devices are disposed so as to surround the region, the directional stationary device has the directional antenna that has a high gain in a direction of the motion region, and therefore, when a reception condition at the directional stationary device is taken into account, it can be determined with certainty whether the mobile device is located in front of a non-directional stationary device in proximity to which the directional stationary device is. Hence, a received signal strength indicator of a non-directional stationary device that has been erroneously detected due to the effects of multipath and so forth is kept from being used for location estimation.

Furthermore, the three or more non-directional stationary devices may constitute a wireless mesh network, and the directional stationary device may communicate wirelessly with at least one non-directional stationary device of the three or more non-directional stationary devices.

Thus, since the three or more non-directional stationary devices constitute a wireless mesh network and the directional stationary device communicates wirelessly with any of the three or more non-directional stationary devices, all the non-directional stationary devices and the directional stationary device constitute one wireless mesh network, and a system in which location estimation and intercommunication between stationary devices are performed using the same radio communications is constructed.

Furthermore, there may be further included a location estimation device configured to receive the pieces of location estimation information from the three or more non-directional stationary devices, receive the piece of complementary information from the directional stationary device, and estimate the location of the mobile device by using the pieces of location estimation information and the piece of complementary information that have been received.

Thus, the use of a piece of complementary information can avoid the use, for location estimation, of a received signal strength indicator of a non-directional stationary device that has been erroneously detected due to the effects of multipath and so forth, an error in location estimation based on multipath and so forth is therefore reduced, and the location of the mobile device is estimated with high accuracy.

Furthermore, the location estimation device may identify, in accordance with the pieces of location estimation information and the piece of complementary information, a non-directional stationary device used for location estimation from among the three or more non-directional stationary devices and may estimate the location of the mobile device by using the piece of location estimation information received from the identified non-directional stationary device. More specifically, the location estimation device may identify a non-directional stationary device used for location estimation from among the non-directional stationary devices disposed in proximity to the directional stationary device that has output a piece of complementary information indicating a received signal strength indicator higher than a predetermined value.

Thus, since only a received signal strength indicator of a non-directional stationary device disposed in proximity to the directional stationary device that has output a piece of complementary information indicating a received signal strength indicator higher than the predetermined value is used for location estimation, the use, for location estimation, of a received signal strength indicator of a non-directional stationary device that has been erroneously detected due to the effects of multipath and so forth is avoided with more certainty, and an error in location estimation based on multipath and so forth is reduced.

Furthermore, the location estimation device may identify, by giving a high priority to a non-directional stationary device that has output a piece of location estimation information indicating a higher received signal strength indicator, candidates for a non-directional stationary device used for location estimation from among the three or more non-directional stationary devices, and may identify a non-directional stationary device used for location estimation by excluding, from the identified candidates for the non-directional stationary device, a non-directional stationary device disposed in proximity to the directional stationary device that has output a piece of complementary information indicating a received signal strength indicator not higher than the predetermined value.

Thus, candidates for a non-directional stationary device used for location estimation are temporarily identified, and then these candidates for the non-directional stationary device can be narrowed down to a correct non-directional stationary device appropriate for location estimation by using a piece of complementary information. Hence, a received signal strength indicator of a non-directional stationary device that has been erroneously detected due to multipath and so forth is kept from being used for location estimation, and highly accurate location estimation is achieved.

Furthermore, a location estimation method according to one embodiment of the present disclosure is a location estimation method of estimating a location of a mobile device in accordance with received signal strength indicators obtained when three or more stationary devices receive a radio signal transmitted by the mobile device. The location estimation method includes receiving, from three or more non-directional stationary devices having a non-directional antenna configured to receive a radio signal transmitted by the mobile device, pieces of location estimation information indicating received signal strength indicators of the radio signal; receiving, from a directional stationary device having a directional antenna configured to receive a radio signal transmitted by the mobile device, a piece of complementary information indicating a received signal strength indicator of the radio signal; identifying, in accordance with the pieces of location estimation information and the piece of complementary information that have been received, a non-directional stationary device used for location estimation from among the three or more non-directional stationary devices; and estimating the location of the mobile device by using the piece of location estimation information received from the identified non-directional stationary device.

Thus, a non-directional stationary device used for location estimation is identified from among the three or more non-directional stationary devices in accordance with pieces of location estimation information and a piece of complementary information, the use of a piece of complementary information can therefore avoid the use, for location estimation, of a received signal strength indicator of a non-directional stationary device that has been erroneously detected due to the effects of multipath and so forth, and an error in location estimation based on multipath and so forth is reduced. An existing location estimation system is constituted only by a non-directional stationary device, whereas the directional stationary device that acts as a complementary role is simply added without, for example, necessarily increasing or changing the number or locations of non-directional stationary devices used for location estimation, and thus a location estimation system that estimates the location of the mobile device with high accuracy is constructed without necessarily causing a great increase in cost. Furthermore, with respect to a non-directional stationary device used for location estimation, a plurality of antennas do not have to be switched as in the related art, and thus the location estimation system that can also be used as a system in which location estimation and intercommunication between stationary devices are performed using the same radio communications is constructed.

The present disclosure implements a location estimation system in which an error in location estimation based on multipath and so forth is reduced, and a location estimation method. The location estimation system does not cause a great increase in cost and can also be used as a system in which location estimation and intercommunication between stationary devices are performed using the same radio communications.

DETAILED DESCRIPTION

An embodiment of the present disclosure will be described in detail below with reference to the drawings. Note that each embodiment described below describes a specific example of the present disclosure. Numerical values, shapes, materials, components, the placement location and connection configuration of the components, steps, the order of steps, and so forth that are described in the following embodiment are merely examples and are not intended to limit the present disclosure.

Furthermore, among the components in the following embodiment, a component not described in an independent claim describing the most generic concept of the present disclosure is described as an optional component.

Figure 1:
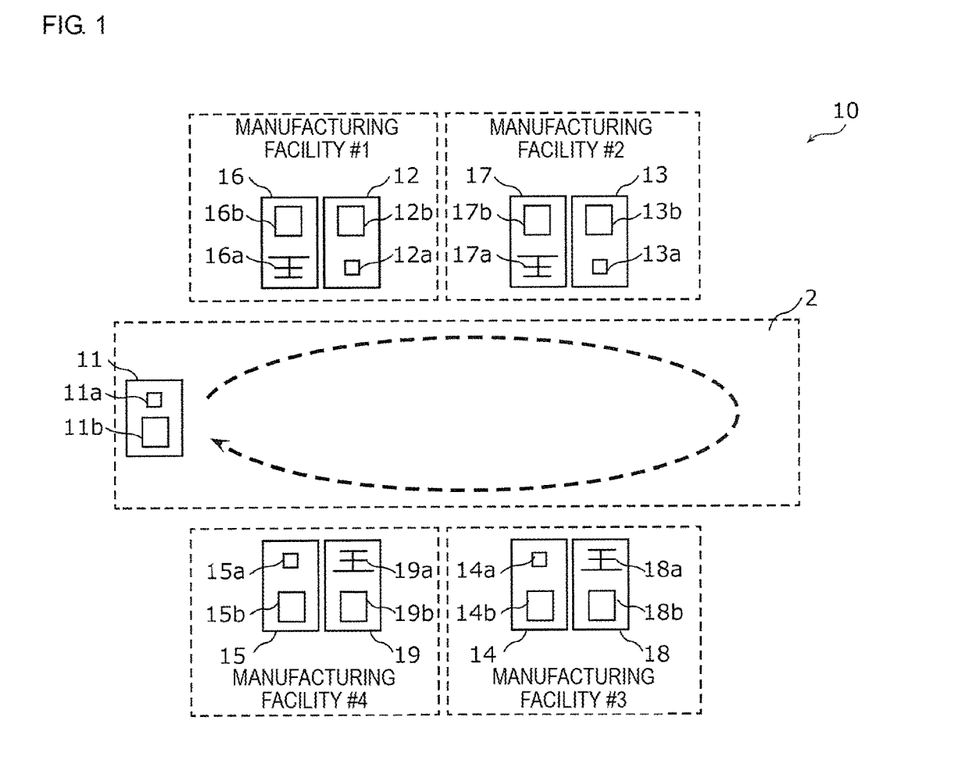
FIG. 1 illustrates a configuration of a location estimation system according to an embodiment.

FIG. 1 illustrates a configuration of a location estimation system 10 according to an embodiment. Here, a mobile device 11 is also illustrated.

The location estimation system 10 is a system used as a system that estimates the location of the mobile device 11 in accordance with received signal strength indicators obtained when three or more stationary devices receive a radio signal transmitted by the mobile device 11. The location estimation system 10 includes three or more non-directional stationary devices (here, four non-directional stationary devices 12 to 15) having a non-directional antenna that receives a radio signal transmitted by the mobile device 11, and directional stationary devices (here, four directional stationary devices 16 to 19) having a directional antenna that receives a radio signal transmitted by the mobile device 11.

The mobile device 11 includes a non-directional antenna 11a, and a communication circuit 11b that performs control to transmit a radio signal via the non-directional antenna 11a. A radio signal is, for example, a signal including an ID associated with the mobile device 11 and is transmitted at certain intervals using a communication scheme, such as Bluetooth (registered trademark) or Wi-Fi (registered trademark). The mobile device 11 is a mobile communication device, such as an RFID tag or a smartphone, and is carried by a worker who walks around a passage provided in a building to inspect each of a plurality of manufacturing facilities installed in the building. The passage along which the worker goes is an example of a motion region 2, which is a region in which the mobile device 11 moves.

The non-directional stationary devices 12 to 15 include respective non-directional antennas 12a to 15a, and respective communication circuits 12b to 15b that perform control to receive a radio signal transmitted by the mobile device 11 via the respective non-directional antennas 12a to 15a. The non-directional stationary devices 12 to 15 output, as pieces of location estimation information for estimating the location of the mobile device 11, pieces of information indicating received signal strength indicators of the received radio signal. The non-directional stationary devices 12 to 15 are communication devices compliant with a communication scheme, such as Bluetooth (registered trademark) or Wi-Fi (registered trademark), and output pieces of location estimation information each time the non-directional stationary devices 12 to 15 detect the mobile device 11.

The directional stationary devices 16 to 19 include respective directional antennas 16a to 19a, and respective communication circuits 16b to 19b that perform control to receive a radio signal transmitted by the mobile device 11 via the respective directional antennas 16a to 19a. The directional stationary devices 16 to 19 output, as pieces of complementary information for identifying a non-directional stationary device used for location estimation from among the non-directional stationary devices 12 to 15, pieces of information indicating received signal strength indicators of the received radio signal. The reason why the directional stationary devices 16 to 19 serve as sources of pieces of complementary information is because, since the directional stationary devices 16 to 19 include the respective directional antennas 16a to 19a, each of the directional stationary devices 16 to 19 receives only a radio signal from a specific direction in comparison with a non-directional stationary device including a non-directional antenna and thus can detect the mobile device 11 present in the specific direction with a high degree of reliability without necessarily being much affected by multipath and so forth. The directional stationary devices 16 to 19 are communication devices compliant with a communication scheme, such as Bluetooth (registered trademark) or Wi-Fi (registered trademark), and output pieces of complementary information each time the directional stationary devices 16 to 19 detect the mobile device 11.

Incidentally, location estimation information and complementary information are transferred to a location estimation device, for example, via a wireless mesh network, which will be described later, constituted by the non-directional stationary devices 12 to 15 and the directional stationary devices 16 to 19, and are used for location estimation of the mobile device 11 performed by the location estimation device.

Here, the locations where the non-directional stationary devices 12 to 15 and the directional stationary devices 16 to 19 are disposed are as follows. That is, the non-directional stationary devices 12 to 15 are disposed outside the motion region 2 so as to surround the motion region 2. In the present embodiment, the motion region 2 is a linear passage provided in the building. On one side of the passage, the non-directional stationary device 12 and the non-directional stationary device 13 are disposed side by side. On the other side of the passage, the non-directional stationary device 14 and the non-directional stationary device 15 are disposed side by side. The non-directional stationary device 12 and the non-directional stationary device 15 are disposed substantially facing each other across the passage, and the non-directional stationary device 13 and the non-directional stationary device 14 are disposed substantially facing each other across the passage.

Meanwhile, the directional stationary devices 16 to 19 are disposed in proximity to the respective non-directional stationary devices 12 to 15. Here, "a directional stationary device and a non-directional stationary device are disposed in proximity to each other" refers to the fact that the directional stationary device and the non-directional stationary device are disposed in sufficient proximity to each other to allow radio communications between them, and includes, for example, the fact that the directional stationary device and the non-directional stationary device are disposed in contact with each other, and the fact that the directional stationary device and the non-directional stationary device are disposed away from each other within a range of a predetermined distance where communication is possible. Furthermore, the directional stationary devices 16 to 19 are disposed so that directions in which gains of their respective directional antennas 16a to 19a reach their maximum values point towards the motion region 2. This is because the directional stationary devices 16 to 19 determine whether the mobile device 11 is located in front of the respective non-directional stationary devices 12 to 15 in proximity to them.

In the present embodiment, a pair of the non-directional stationary device 12 and the directional stationary device 16 disposed in proximity to each other is disposed in proximity to a manufacturing facility #1. Similarly, a pair of the non-directional stationary device 13 and the directional stationary device 17 disposed in proximity to each other is disposed in proximity to a manufacturing facility #2. Similarly, a pair of the non-directional stationary device 14 and the directional stationary device 18 disposed in proximity to each other is disposed in proximity to a manufacturing facility #3. Similarly, a pair of the non-directional stationary device 15 and the directional stationary device 19 disposed in proximity to each other is disposed in proximity to a manufacturing facility #4. This is done to determine which manufacturing facility the worker carrying the mobile device 11 has worked near.

Figure 2A:
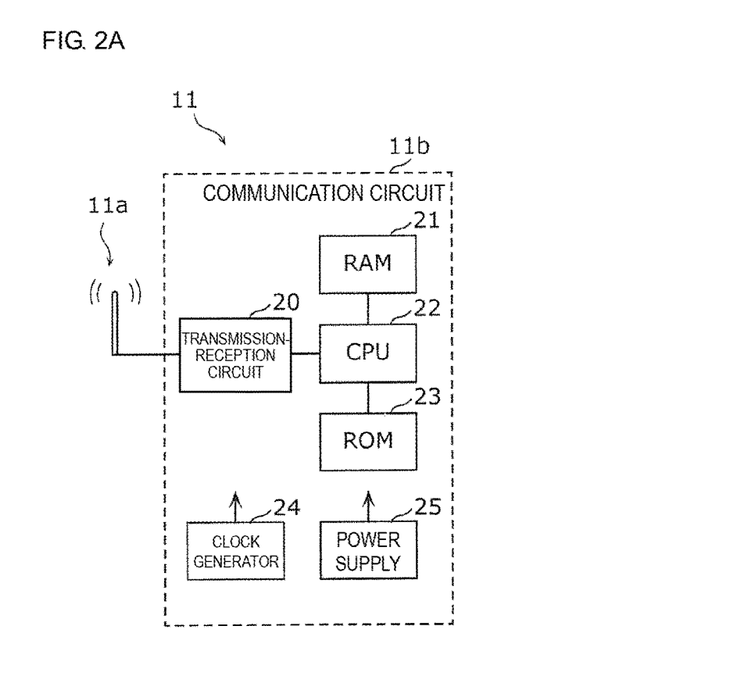
FIG. 2A is a block diagram illustrating a configuration of a mobile device illustrated in FIG. 1.

FIG. 2A is a block diagram illustrating a configuration of the mobile device 11 illustrated in FIG. 1. The mobile device 11 includes the non-directional antenna 11a, and the communication circuit 11b that performs control to transmit a radio signal via the non-directional antenna 11a.

The non-directional antenna 11a is an antenna that has an equal gain in all directions in a horizontal plane, for example a whip antenna.

The communication circuit 11b is constituted by a transmission-reception circuit 20, a RAM 21, a CPU 22, a ROM 23, a clock generator 24, and a power supply 25. The transmission-reception circuit 20 is a circuit that performs amplification, filtering, modulation/demodulation, and so forth to transmit and receive a radio signal via the non-directional antenna 11a. The RAM 21 is a memory IC that temporarily stores data or a program. The ROM 23 is a non-volatile memory IC that stores a control program or data. The CPU 22 is a processor that performs, by loading the control program stored in the ROM 23 into the RAM 21 and executing the control program, a process of performing a function of the mobile device 11, such as transmitting a radio signal including an ID at certain intervals via the transmission-reception circuit 20 and the non-directional antenna 11a. The clock generator 24 is a circuit that generates a clock signal and supplies the clock signal to circuit elements. The power supply 25 is a circuit that supplies power, such as direct-current voltage, to each circuit element on the basis of power supplied from a built-in battery.

Figure 2B:
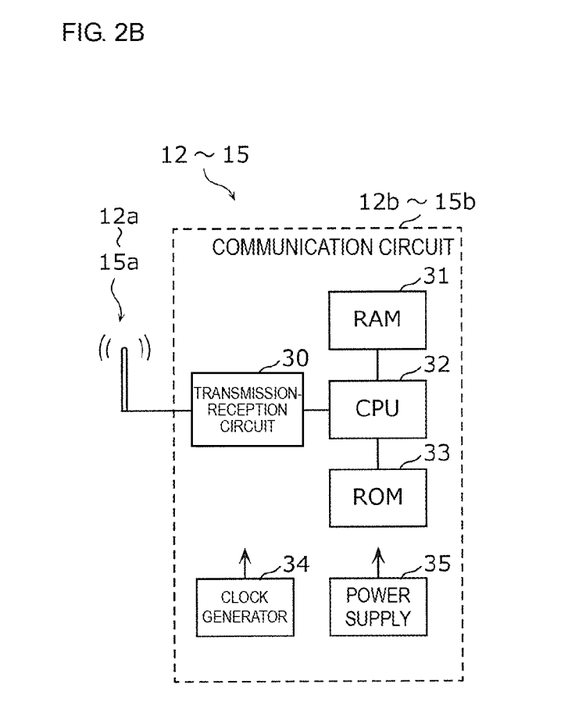
FIG. 2B is a block diagram illustrating a configuration of each of non-directional stationary devices illustrated in FIG. 1.

FIG. 2B is a block diagram illustrating a configuration of each of the non-directional stationary devices 12 to 15 illustrated in FIG. 1. The non-directional stationary devices 12 to 15 include the respective non-directional antennas 12a to 15a, and the respective communication circuits 12b to 15b that perform control to receive a radio signal via the respective non-directional antennas 12a to 15a.

Each of the non-directional antennas 12a to 15a is an antenna that has an equal gain in all directions in a horizontal plane, for example a whip antenna.

Each of the communication circuits 12b to 15b is constituted by a transmission-reception circuit 30, a RAM 31, a CPU 32, a ROM 33, a clock generator 34, and a power supply 35. The transmission-reception circuit 30 is a circuit that performs amplification, filtering, modulation/demodulation, and so forth to transmit and receive a radio signal via the corresponding non-directional antenna 12a, 13a, 14a, or 15a. The RAM 31 is a memory IC that temporarily stores data or a program. The ROM 33 is a non-volatile memory IC that stores a control program or data. The CPU 32 is a processor that performs, by loading the control program stored in the ROM 33 into the RAM 31 and executing the control program, a process of performing a function of the corresponding non-directional stationary device 12, 13, 14, or 15, such as receiving a radio signal transmitted by the mobile device 11 via the corresponding non-directional antenna 12a, 13a, 14a, or 15a and outputting, as a piece of location estimation information for estimating the location of the mobile device 11, a piece of information indicating a received signal strength indicator of the received radio signal. The clock generator 34 is a circuit that generates a clock signal and supplies the clock signal to circuit elements. The power supply 35 is a circuit that supplies power, such as direct-current voltage, to each circuit element on the basis of power supplied from a built-in battery.

Figure 2C:
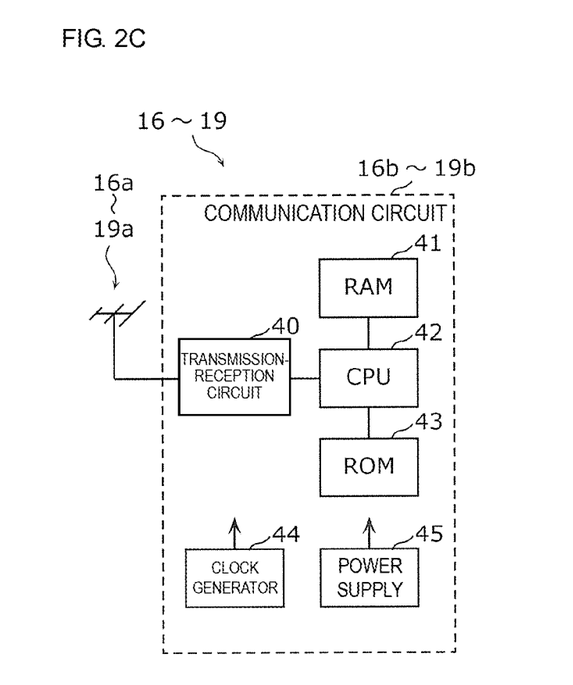
FIG. 2C is a block diagram illustrating a configuration of each of directional stationary devices illustrated in FIG. 1.

FIG. 2C is a block diagram illustrating a configuration of each of the directional stationary devices 16 to 19 illustrated in FIG. 1. The directional stationary devices 16 to 19 include the respective directional antennas 16a to 19a, and the respective communication circuits 16b to 19b that perform control to receive a radio signal via the respective directional antennas 16a to 19a.

Each of the directional antennas 16a to 19a is an antenna that has a high gain in a specific direction in a horizontal plane, for example a Yagi antenna, an array antenna, or the like.

Each of the communication circuits 16b to 19b is constituted by a transmission-reception circuit 40, a RAM 41, a CPU 42, a ROM 43, a clock generator 44, and a power supply 45. The transmission-reception circuit 40 is a circuit that performs amplification, filtering, modulation/demodulation, and so forth to transmit and receive a radio signal via the corresponding directional antenna 16a, 17a, 18a, or 19a. The RAM 41 is a memory IC that temporarily stores data or a program. The ROM 43 is a non-volatile memory IC that stores a control program or data. The CPU 42 is a processor that performs, by loading the control program stored in the ROM 43 into the RAM 41 and executing the control program, a process of performing a function of the corresponding directional stationary device 16, 17, 18, or 19, such as receiving a radio signal transmitted by the mobile device 11 via the corresponding directional antenna 16a, 17a, 18a, or 19a and outputting, as the above-described piece of complementary information, a piece of information indicating a received signal strength indicator of the received radio signal. The clock generator 44 is a circuit that generates a clock signal and supplies the clock signal to circuit elements. The power supply 45 is a circuit that supplies power, such as direct-current voltage, to each circuit element on the basis of power supplied from a built-in battery.

Figure 3A:
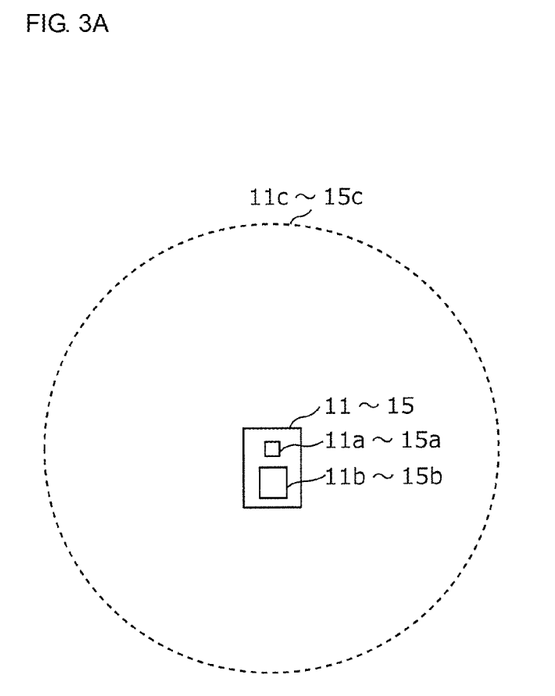
FIG. 3A illustrates each of communication ranges of the mobile device and the non-directional stationary devices that are illustrated in FIG. 1.

FIG. 3A illustrates each of communication ranges 11c to 15c of the mobile device 11 and the non-directional stationary devices 12 to 15 that are illustrated in FIG. 1. Each of the non-directional antennas 11a to 15a has a substantially equal gain in any direction in 360 degrees in a horizontal plane. Hence, the communication ranges 11c to 15c of the mobile device 11 and the non-directional stationary devices 12 to 15 are circular. The non-directional stationary devices 12 to 15 can significantly detect the presence of the mobile device 11 when the mobile device 11 is located within the respective communication ranges 12c to 15c, and output, as pieces of location estimation information, pieces of information indicating received signal strength indicators of a radio signal received from the mobile device 11 at that time.

Figure 3B:
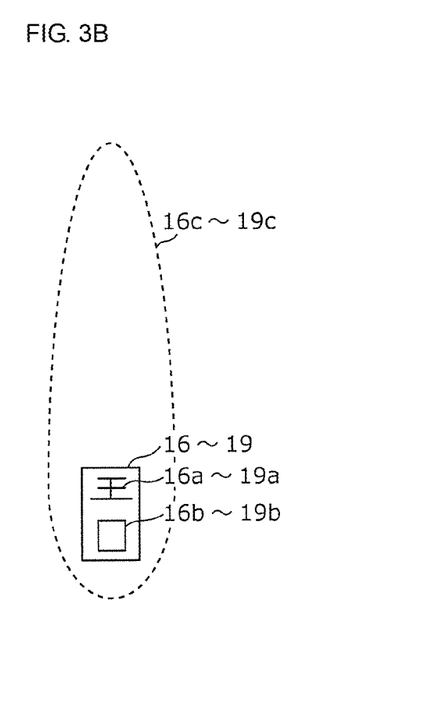
FIG. 3B illustrates each of communication ranges of the directional stationary devices illustrated in FIG. 1.

FIG. 3B illustrates each of communication ranges 16c to 19c of the directional stationary devices 16 to 19 illustrated in FIG. 1. Each of the directional antennas 16a to 19a has single directivity in which, in a horizontal plane, a gain is high in a front direction and is low in lateral and rear directions. Hence, the communication ranges 16c to 19c of the directional stationary devices 16 to 19 are elliptical, tapering down in the front direction. The directional stationary devices 16 to 19 can significantly detect the presence of the mobile device 11 when the mobile device 11 is located within these respective communication ranges 16c to 19c, and output, as pieces of complementary information, pieces of information indicating received signal strength indicators of a radio signal received from the mobile device 11 at that time.

Figure 3C:
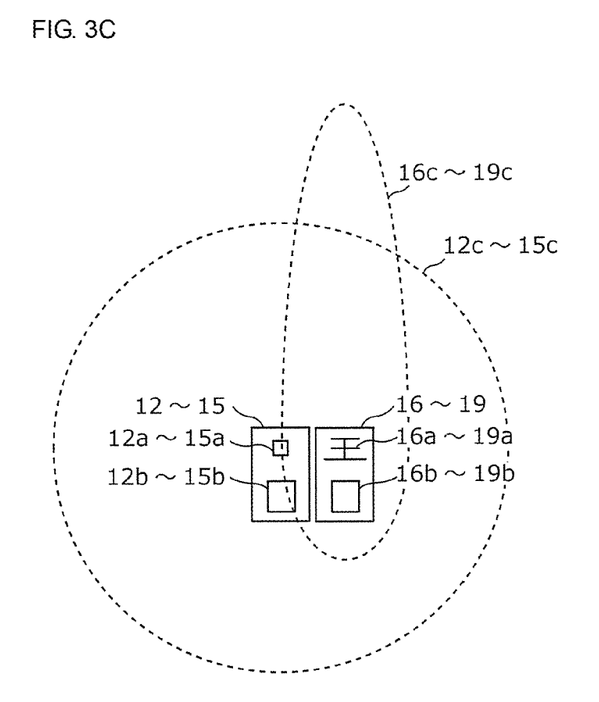
FIG. 3C illustrates a communication range of a pair of a non-directional stationary device and a directional stationary device that are disposed in proximity to each other.

FIG. 3C illustrates a communication range of a pair of a non-directional stationary device and a directional stationary device (each of pairs of the respective non-directional stationary devices 12 to 15 and the respective directional stationary devices 16 to 19) that are disposed in proximity to each other. FIG. 3C corresponds to a figure obtained by combining each of the communication ranges 12c to 15c illustrated in FIG. 3A and each of the communication ranges 16c to 19c illustrated in FIG. 3B.

Figure 4:
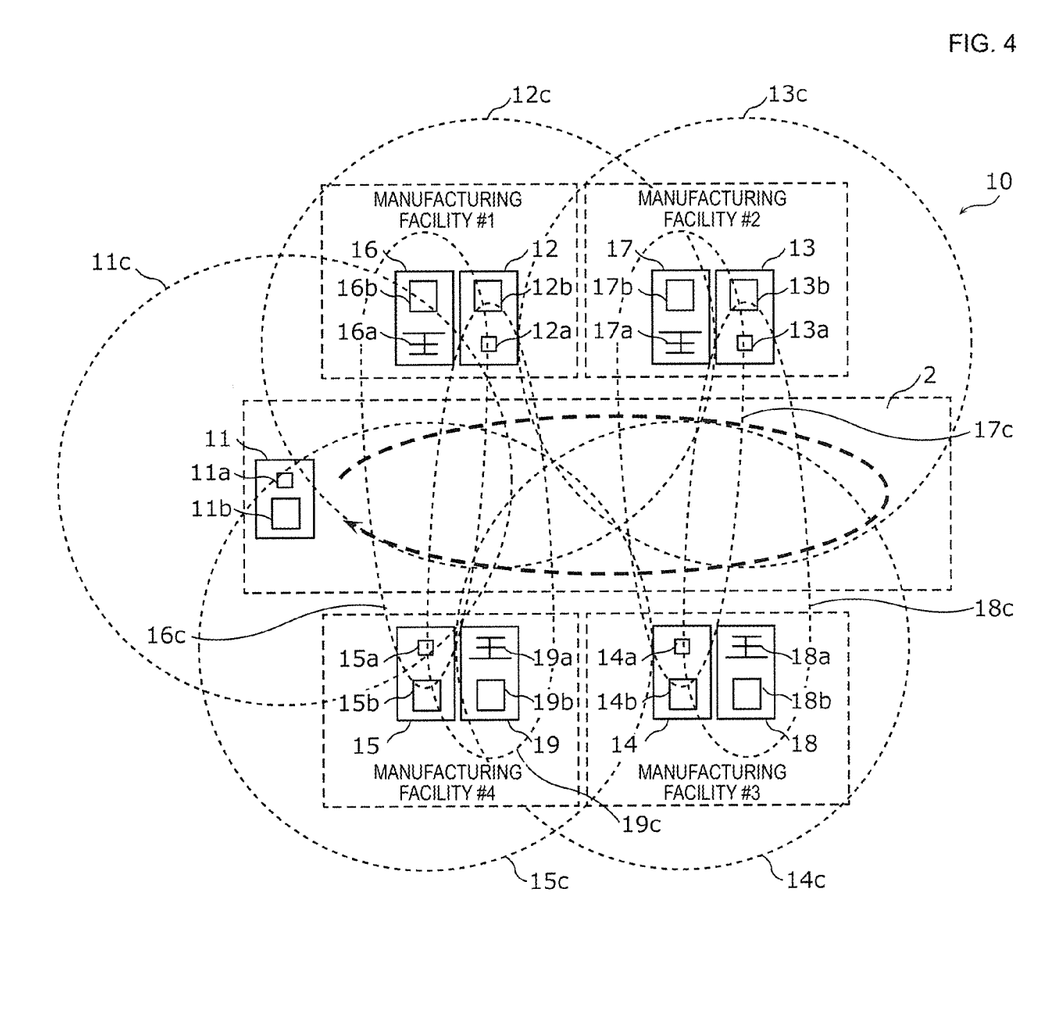
FIG. 4 illustrates a communication range of the location estimation system according to the embodiment.

FIG. 4 illustrates a communication range of the location estimation system 10 according to the present embodiment, that is, a communication range obtained by superimposing, on one another, the communication ranges of all the non-directional stationary devices 12 to 15 and the directional stationary devices 16 to 19 that constitute the location estimation system 10.

The location estimation system 10 according to the present embodiment having a characteristic communication range illustrated in this figure can reduce an error in location estimation based on multipath and so forth in location estimation processing as follows.

Assume that the mobile device 11 now approaches the manufacturing facility #1. Then, a radio signal transmitted by the mobile device 11 is reflected by a tall metal rack or the like where the manufacturing facility #1 and/or the non-directional stationary device 12 are/is placed, thereby causing multipath. As a result, the radio signal can travel in a direction of the manufacturing facility #3.

In this situation where multipath has occurred, the non-directional stationary device 12 disposed in proximity to the manufacturing facility #1 and the non-directional stationary device 14 disposed in proximity to the manufacturing facility #3 detect a relatively high received signal strength indicator. On the other hand, the non-directional stationary device 13 disposed in proximity to the manufacturing facility #2 and the non-directional stationary device 15 disposed in proximity to the manufacturing facility #4 detect a relatively low received signal strength indicator.

Thus, if the location of the mobile device 11 is estimated by using only the non-directional stationary devices 12 to 15, the location of the mobile device 11 is estimated by using a received signal strength indicator at the non-directional stationary device 14 that has erroneously detected a high received signal strength indicator due to the effects of multipath; as a result, an incorrect location is estimated.

In the location estimation system 10 according to the present embodiment, however, since the directional stationary devices 16 to 19 are provided in addition to the non-directional stationary devices 12 to 15, even in the above-described situation where multipath has occurred, the directional stationary device 16 disposed in proximity to the manufacturing facility #1 detects a highest received signal strength indicator among the directional stationary devices 16 to 19, the directional stationary device 19 disposed in proximity to the manufacturing facility #4 detects a second highest received signal strength indicator, and the directional stationary device 17 disposed in proximity to the manufacturing facility #2 and the directional stationary device 18 disposed in proximity to the manufacturing facility #3 do not detect any significant received signal strength indicator (are not able to detect the mobile device 11).

Hence, from results of the received signal strength indicators at the directional stationary devices 16 to 19, it is found that the mobile device 11 is located closest to the manufacturing facility #1 among the manufacturing facilities #1 to #4, thereby avoiding erroneous estimation of the location of the mobile device 11 using a received signal strength indicator at the non-directional stationary device 14 that has erroneously detected a high received signal strength indicator due to the effects of multipath. That is, a correct location of the mobile device 11 can be estimated by using received signal strength indicators at the non-directional stationary device 12, the non-directional stationary device 13, and the non-directional stationary device 15 that have not been much affected by multipath.

As described above, the location estimation system 10 according to the present embodiment is a location estimation system used as a system that estimates the location of the mobile device 11 in accordance with received signal strength indicators obtained when three or more stationary devices receive a radio signal transmitted by the mobile device 11. The location estimation system 10 includes the non-directional stationary devices 12 to 15 having the respective non-directional antennas 12*a* to 15*a* that receive a radio signal transmitted by the mobile device 11; and the directional stationary devices 16 to 19 having the respective directional antennas 16*a* to 19*a* that receive a radio signal transmitted by the mobile device 11. The non-directional stationary devices 12 to 15 output, as pieces of location estimation information for estimating the location of the mobile device 11, pieces of information indicating received signal strength indicators of the received radio signal. The directional stationary devices 16 to 19 output, as pieces of complementary information for identifying a non-directional stationary device used for location estimation from among the non-directional stationary devices 12 to 15, pieces of information indicating received signal strength indicators of the received radio signal.

Thus, the location estimation system 10 includes the directional stationary devices 16 to 19 that output pieces of complementary information for identifying a non-directional stationary device used for location estimation from among the non-directional stationary devices 12 to 15, the use of pieces of complementary information can therefore avoid the use, for location estimation, of a received signal strength indicator of a non-directional stationary device that has been erroneously detected due to the effects of multipath and so forth, and an error in location estimation based on multipath and so forth is reduced. An existing location estimation system is constituted only by a non-directional stationary device, whereas the directional stationary devices 16 to 19 that act as complementary roles are simply added without, for example, necessarily increasing or changing the number or locations of non-directional stationary devices used for location estimation, and thus the location estimation system 10 that estimates the location of the mobile device 11 with high accuracy is constructed without necessarily causing a great increase in cost. Furthermore, with respect to a non-directional stationary device used for location estimation, a plurality of antennas do not have to be switched as in the related art, and thus the location estimation system 10 that can also be used as a system in which location estimation and intercommunication between stationary devices are performed using the same radio communications is constructed.

Furthermore, even in an environment where there are a lot of multipath and so forth, the accuracy of location estimation can be ensured without necessarily giving special consideration to the locations where the non-directional stationary devices 12 to 15 are installed or without necessarily installing any radio wave absorber, for example. Additionally, intercommunication between the directional stationary devices 16 to 19 and the non-directional stationary devices 12 to 15 can easily be provided, and thus control or re-routing involved in switching between antennas having different directivities is unnecessary. The directional stationary devices 16 to 19 can be utilized for location estimation even without necessarily using a special device that detects a direction in which the mobile device 11 is present.

Furthermore, the directional stationary devices 16 to 19 are disposed in proximity to one non-directional stationary device of the non-directional stationary devices 12 to 15.

Thus, when reception conditions at the directional stationary devices 16 to 19 are taken into account, it can be determined whether the mobile device 11 is located close to non-directional stationary devices in proximity to which the directional stationary devices 16 to 19 are disposed, thereby keeping a received signal strength indicator of a non-directional stationary device that has been erroneously detected due to the effects of multipath and so forth from being used for location estimation.

Furthermore, each of the directional stationary devices 16 to 19 is disposed in proximity to one different non-directional stationary device of the non-directional stationary devices 12 to 15.

Thus, when reception conditions at the directional stationary devices 16 to 19 disposed in proximity to all the respective non-directional stationary devices 12 to 15 are taken into account, it can be determined whether the mobile device 11 is located close to each non-directional stationary device, thereby keeping a received signal strength indicator of a non-directional stationary device that has been erroneously detected due to the effects of multipath and so forth from being used for location estimation.

Furthermore, the non-directional stationary devices 12 to 15 are disposed outside the motion region 2, which is a region in which the mobile device 11 moves, so as to surround the motion region 2, and the directional stationary devices 16 to 19 are disposed so that directions in which gains of their respective directional antennas 16*a* to 19*a* reach their maximum values point towards the motion region 2.

Thus, the motion region 2, which is a region in which the mobile device 11 moves, is known in advance, the non-directional stationary devices 12 to 15 are disposed so as to surround the region, the directional stationary devices 16 to 19 have the respective directional antennas 16a to 19a having directivity towards the motion region 2, and therefore, when reception conditions at the directional stationary devices 16 to 19 are taken into account, it can be determined with certainty whether the mobile device 11 is located in front of non-directional stationary devices in proximity to which the directional stationary devices 16 to 19 are. Hence, a received signal strength indicator of a non-directional stationary device that has been erroneously detected due to the effects of multipath and so forth is kept from being used for location estimation.

Figure 5:
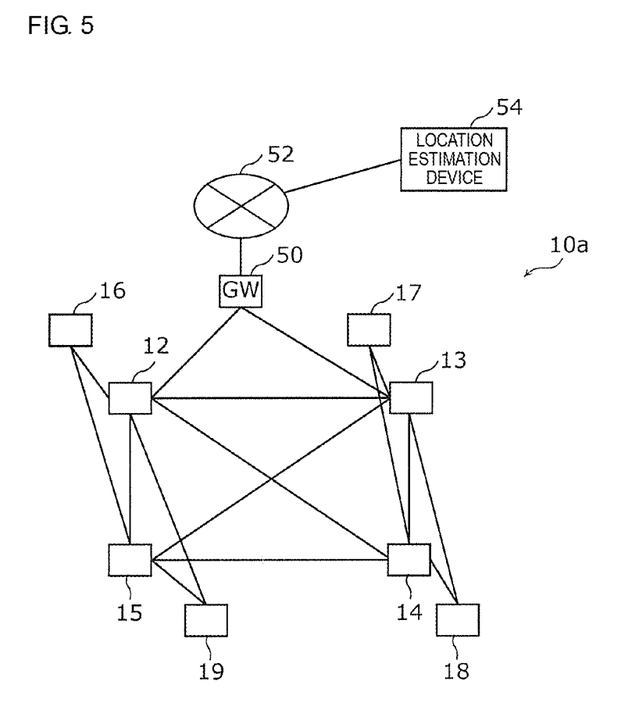
FIG. 5 illustrates a connection topology of a location estimation system according to a modification of the embodiment.

FIG. 5 illustrates a connection topology of a location estimation system 10a according to a modification in which a gateway 50 and a location estimation device 54 are added to the location estimation system 10 according to the above-described embodiment. In this figure, solid lines connecting the non-directional stationary devices 12 to 15, the directional stationary devices 16 to 19, and the gateway 50 connect devices capable of communicating wirelessly with one another to one another.

The non-directional stationary devices 12 to 15 constitute a wireless mesh network using the same communication scheme as a communication scheme used in location estimation. In the present modification, the non-directional stationary devices 12 to 15 are disposed at locations where the non-directional stationary devices 12 to 15 can communicate wirelessly with any other non-directional stationary device via the respective non-directional antennas 12a to 15a.

The directional stationary device 16 is disposed at a location where the directional stationary device 16 can communicate wirelessly with not only the non-directional stationary device 12 disposed in proximity to the directional stationary device 16 but also the non-directional stationary device 15 disposed relatively close to the directional stationary device 16 via the directional antenna 16a by using the same communication scheme as the communication scheme used in location estimation. Similarly, the directional stationary device 17 is disposed at a location where the directional stationary device 17 can communicate wirelessly with the non-directional stationary device 13 and the non-directional stationary device 14 by using the same communication scheme as the communication scheme used in location estimation. Similarly, the directional stationary device 18 is disposed at a location where the directional stationary device 18 can communicate wirelessly with the non-directional stationary device 14 and the non-directional stationary device 13 by using the same communication scheme as the communication scheme used in location estimation. Similarly, the directional stationary device 19 is disposed at a location where the directional stationary device 19 can communicate wirelessly with the non-directional stationary device 15 and the non-directional stationary device 12 by using the same communication scheme as the communication scheme used in location estimation.

On the basis of such a wireless connection relationship, the non-directional stationary devices 12 to 15 and the directional stationary devices 16 to 19 constitute one wireless mesh network using radio communications based on the same communication scheme as that in location estimation. Even information transmitted from any stationary device can be uploaded to the location estimation device 54 via the gateway 50.

The gateway 50 is a gateway that connects the wireless mesh network constituted by the non-directional stationary devices 12 to 15 and the directional stationary devices 16 to 19 to the Internet 52. In the present modification, the gateway 50 includes a communication interface for communicating wirelessly with the non-directional stationary devices 12 and 13 and communicating with the location estimation device 54 via the Internet 52.

The location estimation device 54 is a device that, via the wireless mesh network, the gateway 50, and the Internet 52, receives pieces of location estimation information from the non-directional stationary devices 12 to 15, receives pieces of complementary information from the directional stationary devices 16 to 19, and estimates the location of the mobile device 11 by using the pieces of location estimation information and the pieces of complementary information that have been received. An example of the location estimation device 54 is a computer device constituted by input devices, such as a display and a keyboard, a transmission-reception circuit, a RAM, a CPU, a ROM, a clock generator, and a power supply, for example. The location estimation device 54 identifies, in accordance with the pieces of location estimation information and the pieces of complementary information, a non-directional stationary device used for location estimation from among the non-directional stationary devices 12 to 15 and estimates the location of the mobile device 11 by using a piece of location estimation information received from the identified non-directional stationary device. At this time, the location estimation device 54 identifies a non-directional stationary device used for location estimation from among the non-directional stationary devices 12 to 15 disposed in proximity to the directional stationary devices 16 to 19 that have output a piece of complementary information indicating a received signal strength indicator higher than a predetermined value. Incidentally, the predetermined value may be changed in accordance with installation states of the directional stationary devices 16 to 19, or purposes for installing the directional stationary devices 16 to 19, for example. The predetermined value can easily be changed by only configuring a setting in the location estimation device 54.

Figure 6:
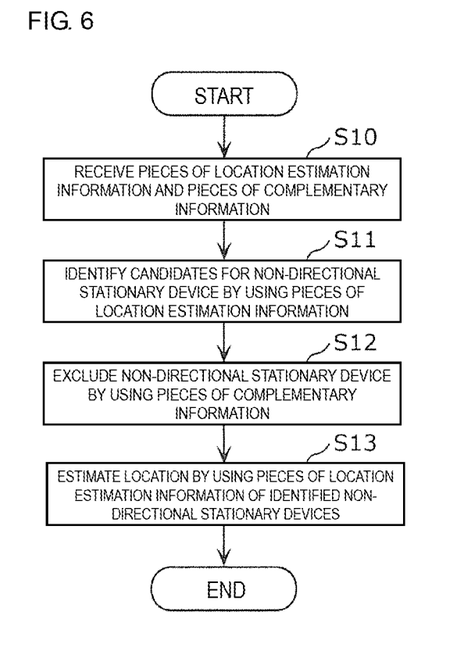
FIG. 6 is a flowchart illustrating an operation performed by the location estimation system illustrated in FIG. 5.

FIG. 6 is a flowchart illustrating an operation performed by the location estimation system 10a according to the modification illustrated in FIG. 5. Here, a processing procedure (location estimation method) performed by the location estimation device 54 is illustrated.

First, via the gateway 50 and the Internet 52, the location estimation device 54 receives pieces of location estimation information transmitted from the non-directional stationary devices 12 to 15 and pieces of complementary information transmitted from the directional stationary devices 16 to 19 (S10).

Subsequently, the location estimation device 54 uses the pieces of location estimation information received in step S10 and thereby identifies, by giving a high priority to a non-directional stationary device that has output a piece of location estimation information indicating a higher received signal strength indicator, candidates for a non-directional stationary device used for location estimation from among the non-directional stationary devices 12 to 15 (S11). For example, in the above-described situation where there are the effects of multipath (the case where the mobile device 11 approaches the manufacturing facility #1), the non-directional stationary devices 12, 14, and 15, which are the top three non-directional stationary devices in decreasing order of received signal strength indicator, are identified as candidates.

Next, the location estimation device 54 uses the pieces of complementary information received in step S10 and thereby identifies non-directional stationary devices used for location estimation by excluding, from the candidates for the non-directional stationary device, a non-directional stationary device disposed in proximity to a directional stationary device that has output a piece of complementary information indicating a received signal strength indicator not higher than the predetermined value (S12). For example, in the above-described situation where there are the effects of multipath, the directional stationary device 18 transmits a piece of complementary information indicating a received signal strength indicator not higher than the predetermined value, and the non-directional stationary device 14 disposed in proximity to the directional stationary device 18 is therefore excluded from the non-directional stationary devices 12, 14, and 15, which are the top three candidates. In this case, as a result, the candidates are two non-directional stationary devices (non-directional stationary devices 12 and 15), the non-directional stationary device 13 is therefore added that has transmitted a piece of location estimation information indicating a second highest received signal strength indicator after the two non-directional stationary devices 12 and 15, and three non-directional stationary devices 12, 13, and 15 are finally identified as non-directional stationary devices used for location estimation.

Finally, the location estimation device 54 estimates the location of the mobile device 11 by using the non-directional stationary devices identified in step S12 (S13). For example, the location of the mobile device 11 is estimated by using a three-point positioning method using the three non-directional stationary devices 12, 13, and 15 identified in step S12. At this time, weight may be assigned to received signal strength indicators indicated by pieces of location estimation information received from the non-directional stationary devices 12, 13, and 15 or assigned to distances corresponding to the respective received signal strength indicators to further improve accuracy, and the location of the mobile device 11 may be estimated.

The location estimation device 54 repeats the above processes S10 to S13 each time the location estimation device 54 receives pairs of respective pieces of location estimation information transmitted from the non-directional stationary devices 12 to 15 and respective pieces of complementary information transmitted from the directional stationary devices 16 to 19.

Thus, even in a situation where there are the effects of multipath and so forth, the location estimation device 54 uses a piece of complementary information from a directional stationary device and thereby can narrow candidates for a non-directional stationary device down to a correct non-directional stationary device appropriate for use for location estimation. Hence, a non-directional stationary device that has been erroneously detected due to multipath and so forth is kept from being used for location estimation of the mobile device 11, and highly accurate location estimation is achieved.

In the present modification, to identify a non-directional stationary device used for location estimation, three non-directional stationary devices are first identified, one inappropriate non-directional stationary device is excluded from these non-directional stationary devices by using pieces of complementary information, and then another non-directional stationary device is added by using a piece of location estimation information, whereas the present disclosure is not limited to such a procedure. In the case where the location estimation system is constituted by many non-directional stationary devices, such as ten non-directional stationary devices, all of non-directional stationary devices at which received signal strength indicators exceeding a predetermined threshold value have been detected are identified as candidates, and an inappropriate non-directional stationary device is excluded from these candidates by using pieces of complementary information. As a result, if three or more non-directional stationary devices remain, the location of the mobile device 11 may be estimated by using received signal strength indicators transmitted by these remaining three or more non-directional stationary devices, or by using the top three received signal strength indicators.

As described above, in the location estimation system 10a according to the present modification, the non-directional stationary devices 12 to 15 constitute a wireless mesh network, and the directional stationary devices 16 to 19 communicate wirelessly with at least one non-directional stationary device of the non-directional stationary devices 12 to 15.

Thus, since the non-directional stationary devices 12 to 15 constitute a wireless mesh network and the directional stationary devices 16 to 19 communicate wirelessly with any of the non-directional stationary devices 12 to 15, all the non-directional stationary devices 12 to 15 and the directional stationary devices 16 to 19 constitute one wireless mesh network, and thus a system in which location estimation and intercommunication between stationary devices are performed using the same radio communications is constructed.

Furthermore, the location estimation system 10a according to the present modification includes the location estimation device 54 that receives pieces of location estimation information from the non-directional stationary devices 12 to 15, receives pieces of complementary information from the directional stationary devices 16 to 19, and estimates the location of the mobile device 11 by using the pieces of location estimation information and the pieces of complementary information that have been received.

Thus, the use of pieces of complementary information can avoid the use, for location estimation, of a received signal strength indicator of a non-directional stationary device that has been erroneously detected due to the effects of multipath and so forth, an error in location estimation based on multipath and so forth is therefore reduced, and the location of the mobile device 11 is estimated with high accuracy.

Furthermore, the location estimation device 54 identifies, in accordance with the pieces of location estimation information and the pieces of complementary information, a non-directional stationary device used for location estimation from among the non-directional stationary devices 12 to 15 and estimates the location of the mobile device 11 by using a piece of location estimation information received from the identified non-directional stationary device. More specifically, the location estimation device 54 identifies a non-directional stationary device used for location estimation from among the non-directional stationary devices 12 to 15 disposed in proximity to the directional stationary devices 16 to 19 that have output a piece of complementary information indicating a received signal strength indicator higher than a predetermined value.

Thus, since only non-directional stationary devices disposed in proximity to the directional stationary devices 16 to 19 that have output a piece of complementary information indicating a received signal strength indicator higher than the predetermined value are used for estimating the location of the mobile device 11, the use, for location estimation, of a received signal strength indicator of a non-directional stationary device that has been erroneously detected due to the effects of multipath and so forth is avoided with more certainty, and an error in location estimation based on multipath and so forth is reduced.

Furthermore, the location estimation device 54 identifies, by giving a high priority to a non-directional stationary device that has output a piece of location estimation information indicating a higher received signal strength indicator, candidates for a non-directional stationary device used for location estimation from among the non-directional stationary devices 12 to 15, and identifies a non-directional stationary device used for location estimation by excluding, from the identified candidates for the non-directional stationary device, non-directional stationary devices disposed in proximity to the directional stationary devices 16 to 19 that have output a piece of complementary information indicating a received signal strength indicator not higher than the predetermined value.

Thus, candidates for a non-directional stationary device used for location estimation are temporarily identified, and then these candidates for the non-directional stationary device can be narrowed down to a correct non-directional stationary device appropriate for location estimation by using a piece of complementary information. Hence, a non-directional stationary device that has been erroneously detected due to multipath and so forth is kept from being used for location estimation of the mobile device 11, and highly accurate location estimation is achieved.

Furthermore, a location estimation method in the location estimation system 10a according to the present modification is a location estimation method of estimating the location of the mobile device 11 in accordance with received signal strength indicators obtained when three or more stationary devices receive a radio signal transmitted by the mobile device 11. The location estimation method includes receiving, from the non-directional stationary devices 12 to 15 having the non-directional antennas 12a to 15a that receive a radio signal transmitted by the mobile device 11, pieces of location estimation information indicating received signal strength indicators of the radio signal and receiving, from the directional stationary devices 16 to 19 having the directional antennas 16a to 19a that receive a radio signal transmitted by the mobile device 11, pieces of complementary information indicating received signal strength indicators of the radio signal (S10 in FIG. 6); identifying, in accordance with the pieces of location estimation information and the pieces of complementary information that have been received, a non-directional stationary device used for location estimation from among the non-directional stationary devices 12 to 15 (S11, S12 in FIG. 6); and estimating the location of the mobile device 11 by using a piece of location estimation information received from the identified non-directional stationary device (S13 in FIG. 6).

Thus, a non-directional stationary device used for location estimation is identified from among the non-directional stationary devices 12 to 15 in accordance with pieces of location estimation information and pieces of complementary information, the use of pieces of complementary information can therefore avoid the use, for location estimation, of a received signal strength indicator of a non-directional stationary device that has been erroneously detected due to the effects of multipath and so forth, and an error in location estimation based on multipath and so forth is reduced. An existing location estimation system is constituted only by a non-directional stationary device, whereas the directional stationary devices 16 to 19 that act as complementary roles are simply added without, for example, necessarily increasing or changing the number or locations of non-directional stationary devices used for location estimation, and thus the location estimation system that estimates the location of the mobile device 11 with high accuracy is constructed without necessarily causing a great increase in cost. Furthermore, with respect to a non-directional stationary device used for location estimation, a plurality of antennas do not have to be switched as in the related art, and thus the location estimation system that can also be used as a system in which location estimation and intercommunication between stationary devices are performed using the same radio communications is constructed.

Although the location estimation system and the location estimation method according to the present disclosure have been described above on the basis of the embodiment and the modification, the present disclosure is not limited to the embodiment and the modification. Embodiments obtained by making various modifications found by a person skilled in the art to the present embodiment and the modification, or other embodiments formed by combining some components in the embodiment and the modification are also included in the scope of the present disclosure as long as they do not depart from the gist of the present disclosure.

For example, although, in the above-described embodiment and modification, four directional stationary devices 16 to 19 are disposed in proximity to the respective non-directional stationary devices 12 to 15, a directional stationary device and a non-directional stationary device do not necessarily have to be disposed so as to form a pair. When at least one directional stationary device is disposed in proximity to one non-directional stationary device of the non-directional stationary devices 12 to 15, the erroneous use, for location estimation, of the non-directional stationary device due to the effects of multipath and so forth is avoided. Alternatively, a directional stationary device may be disposed only at a place where it is desired to determine the location of the worker carrying the mobile device 11.

Furthermore, although, in the above-described embodiment and modification, all the directional stationary devices 16 to 19 are disposed in proximity to the respective non-directional stationary devices 12 to 15, all directional stationary devices do not necessarily have to be disposed in proximity to a non-directional stationary device. The location estimation system may include a directional stationary device disposed at a location not in proximity to any non-directional stationary devices. This is because even a directional stationary device disposed at such a location can detect the mobile device 11 present in a specific direction with a high degree of reliability without necessarily being much affected by multipath and so forth and thus is useful in estimating an approximate location of the mobile device 11.

Furthermore, although, in the above-described embodiment and modification, the non-directional stationary devices 12 to 15 and the directional stationary devices 16 to 19 are disposed outside the motion region 2 so as to surround the motion region 2, the disposition is not limited to such a disposition. For example, when the motion region 2 is large, a non-directional stationary device may also be disposed within the motion region 2. That is, a plurality of non-directional stationary devices are disposed in such a manner as to be scattered within a region of a certain size, and the mobile device 11 may move to any place in such a region. In such a case, a plurality of directional stationary devices that detect that the mobile device 11 has approached a plurality of sides of one non-directional stationary device may be provided (for example, four directional stationary devices that detect that the mobile device 11 has approached to each of front, back, right, and left sides of the non-directional stationary device may be provided).

Furthermore, although, in the above-described modification, the non-directional stationary devices 12 to 15 and the directional stationary devices 16 to 19 constitute a wireless mesh network, the mobile device 11 may be involved in this wireless mesh network. For example, when the mobile device 11 uploads, for example, stay information (information about the worker entering and leaving the building) to the location estimation device 54 via the wireless mesh network, the location estimation device 54 can manage in real time where the worker carrying the mobile device 11 is located and whether the worker has entered or left the building.

Furthermore, although, in the above-described modification, the non-directional stationary devices 12 to 15, the directional stationary devices 16 to 19, and the gateway 50 are connected using radio communications, an interconnection between these may be a connection using a communication scheme (for example, a connection using a wired LAN) different from radio communications used in location estimation.

Furthermore, although, in the above-described modification, the location estimation system 10a including the gateway 50 and the Internet 52 has been described, the gateway 50 and the Internet 52 do not necessarily have to be included. That is, the location estimation device 54 may be connected, wirelessly or by wire, directly to the non-directional stationary devices 12 to 15.

Furthermore, although, in the above-described modification, the location estimation device 54 is an independent computer device, the location estimation device 54 may be a device attached to another device. For example, the location estimation device 54 may be included in any of the non-directional stationary devices 12 to 15.

Furthermore, the location estimation method in the above-described modification may be implemented as a program executed by a computer, or may be implemented as a recording medium, such as a computer-readable CD-ROM, storing such a program.

INDUSTRIAL APPLICABILITY

The present disclosure can be used as a location estimation system that estimates the location of a mobile device that transmits a radio signal, for example, as a system that detects the location of the mobile device carried by a worker.

REFERENCE SIGNS LIST 2 motion region
10, 10a location estimation system
11 mobile device
11a, 12a, 13a, 14a, 15a non-directional antenna
11b, 12b, 13b, 14b, 15b, 16b, 17b, 18b, 19b communication circuit
11c, 12c, 13c, 14c, 15c communication range of non-directional antenna
12, 13, 14, 15 non-directional stationary device
16, 17, 18, 19 directional stationary device
16a, 17a, 18a, 19a directional antenna
16c, 17c, 18c, 19c communication range of directional antenna
20, 30, 40 transmission-reception circuit
21, 31, 41 RAM
22, 32, 42 CPU
23, 33, 43 ROM
24, 34, 44 clock generator
25, 35, 45 power supply
50 gateway (GW)
52 Internet
54 location estimation device

The invention claimed is:

1. A location estimation system for estimating a location of a mobile device, the location estimation system comprising:
   three or more non-directional stationary devices each having a non-directional antenna configured to receive a radio signal transmitted by the mobile device; and
   a directional stationary device having a directional antenna configured to receive the radio signal transmitted by the mobile device,
   wherein the three or more non-directional stationary devices are each configured to receive the radio signal by non-directional antennas and to output location estimation information indicating non-directional signal strengths of the radio signal received by non-directional antennas, and
   wherein the directional stationary device is configured to receive the radio signal in a direction by the directional antenna and to output complementary information including a directional signal strength indicator of the radio signal received by the directional antenna,
   wherein the location of the mobile device is estimated based on the location estimation information output by each of the three or more non-directional stationary devices and the complementary information output by the directional stationary device,
   wherein the location estimation system comprises a plurality of the directional stationary devices,
   wherein each of the plurality of directional stationary devices is disposed in proximity to a corresponding one of the three or more non-directional stationary devices.

2. The location estimation system according to claim 1, wherein the directional stationary device is disposed in proximity to one of the three or more non-directional stationary devices.

3. The location estimation system according to claim 1,
   wherein the three or more non-directional stationary devices are disposed outside a region in which the mobile device moves, and
   wherein the directional stationary device is disposed so that a direction in which a gain of the directional antenna reaches a maximum value points towards the region.

4. The location estimation system according to claim 1,
   wherein the three or more non-directional stationary devices constitute a wireless mesh network, and
   wherein the directional stationary device is configured to communicate wirelessly with at least one of the three or more non-directional stationary devices.

5. The location estimation system according to claim 1, further comprising:
   a location estimation device configured to receive the location estimation information from each of the three or more non-directional stationary devices, to receive the complementary information from the directional stationary device, and to estimate the location of the mobile device based on the received location estimation information and the received complementary information.

6. The location estimation system according to claim 5, wherein the location estimation device is configured to identify, in accordance with the location estimation information and the complementary information, one of the three or more non-directional stationary devices, and to estimate the location of the mobile device based on the location estimation information received from the identified non-directional stationary device.

7. The location estimation system according to claim 6, wherein the location estimation device is configured to identify one of the three or more non-directional stationary devices disposed in proximity to the directional stationary device, the complementary information output by the directional stationary device indicating a received signal strength indicator higher than a predetermined value.

8. The location estimation system according to claim 7, wherein the location estimation device is configured to identify, by giving priority to one of the three or more non-directional stationary device that output location estimation information indicating a higher received signal strength indicator, candidates for a non-directional stationary device, and to identify a non-directional stationary device by excluding from the identified candidates for the non-directional stationary device a non-directional stationary device disposed in proximity to the directional stationary device that output complementary information indicating a received signal strength indicator less than or equal to the predetermined value.

9. A location estimation method for estimating a location of a mobile device transmitting a radio signal, the location estimation method comprising:
receiving, from three or more non-directional stationary devices each having a non-directional antenna configured to receive a radio signal received by non-directional antennas, location estimation information indicating a signal strength the radio signal received by non-directional antennas;
receiving, from a plurality of directional stationary devices each having a directional antenna configured to receive a radio signal transmitted by the mobile device, complementary information indicating a directional signal strength of the radio signal received by the directional antenna;
identifying, in accordance with the received location estimation information and the received complementary information, one of the non-directional stationary devices; and
estimating the location of the mobile device based on the location estimation information received from the identified non-directional stationary device,
wherein each of the plurality of directional stationary devices is disposed in proximity to a corresponding one of the three or more non-directional stationary devices.

10. The location estimation method according to claim 9, wherein the directional stationary device is disposed in proximity to one of the three or more non-directional stationary devices.

11. The location estimation method according to claim 9,
wherein the three or more non-directional stationary devices are disposed outside a region in which the mobile device moves, and
wherein the directional stationary device is disposed so that a direction in which a gain of the directional antenna reaches a maximum value points towards the region.

12. The location estimation method according to claim 9,
wherein the three or more non-directional stationary devices constitute a wireless mesh network, and
wherein the directional stationary device communicates wirelessly with at least one of the three or more non-directional stationary devices.

* * * * *